(12) United States Patent
Limburg et al.

(10) Patent No.: US 6,604,854 B1
(45) Date of Patent: *Aug. 12, 2003

(54) THIN FILM THERMOMETER WITH SENSORS THAT APPEAR AND DISAPPEAR FROM RESPECTIVE CONCEALING FEATURES ACCORDING TO TEMPERATURE

(76) Inventors: Randy Martin Limburg, 31160 Electric Ave., Nuevo, CA (US) 92567; Paul Anthony Ridgway, 911 Ridgewood Dr., Julian, CA (US) 92036

( * ) Notice: Subject to any disclaimer, the term of this patent is extended or adjusted under 35 U.S.C. 154(b) by 12 days.

This patent is subject to a terminal disclaimer.

(21) Appl. No.: 09/860,404

(22) Filed: May 18, 2001

Related U.S. Application Data (63) Continuation-in-part of application No. 09/221,643, filed on Dec. 28, 1998, now Pat. No. 6,241,386.

(51) Int. Cl.$^7$ .............................................. G01K 11/12
(52) U.S. Cl. ........................ 374/162; 374/141; 116/207; D10/57; D24/189; 600/549; 428/29; 428/187; 428/914
(58) Field of Search ................... 374/161, 162, 374/141; 116/206, 207, 216; D10/57; D20/11, 99; D24/189; 600/549; 428/1.1, 29, 187, 914, 1.6, 1.61, 1.62

(56) References Cited

U.S. PATENT DOCUMENTS

| | | | |
|---|---|---|---|
| 3,861,213 A | 1/1975 | Parker | 374/161 |
| 3,965,742 A | 6/1976 | Parker | 374/161 |
| 3,969,264 A | 7/1976 | Davis | 252/299.7 |
| 4,019,368 A | 4/1977 | Navato | 374/162 |
| 4,022,706 A | 5/1977 | Davis | 252/299.7 |
| 4,198,920 A | 4/1980 | Russell | 116/202 |
| 4,301,023 A | 11/1981 | Shuberth et al. | 252/299.7 |

(List continued on next page.)

FOREIGN PATENT DOCUMENTS

| | | | |
|---|---|---|---|
| FR | 2254621 | 12/1974 | |
| FR | 2637406 | 4/1990 | 116/216 |
| GB | 2199981 | 12/1988 | |
| JP | 26236 | 2/1983 | 374/162 |
| JP | 35121 | 2/1991 | 116/216 |
| JP | 35122 | 2/1991 | 116/216 |
| JP | 35123 | 2/1991 | 116/216 |

OTHER PUBLICATIONS

"Beer Bottled in Mug," Packaging, vol. 3, No. 6, May 1985, p. 15.*
Brochure by Hallcrest entitled "Handbook of Thermodynamic Liquid Crystal Technology", dated 1991.
Brochure by Hallcrest entitled "Leading the Way in Temperature Indicating Technology", published prior to Dec. 28, 1998.
Brochure by Thermographics entitled "Liquid Crystal Products 1999", published prior to Dec. 28, 1998.

*Primary Examiner*—Diego Gutierrez
*Assistant Examiner*—Stanley J. Pruchnic, Jr.
(74) *Attorney, Agent, or Firm*—Dan Hubert & Assoc.

(57) ABSTRACT

A thin film thermometer has multiple temperature sensors that individually appear within certain concealing features of the decal under different temperature ranges, otherwise blending into the concealing features and thereby disappearing into the design. Among other uses, this thermometer may be implemented as an adhesive bandage or refrigerator magnet, and may include special features such as a hologram, heat blocking backing, and ink-preserving adhesive tie coat. Also, enhanced visual effects are achieved through the coordinated multiple activation of temperature sensors.

27 Claims, 5 Drawing Sheets

U.S. PATENT DOCUMENTS

| | | | |
|---|---|---|---|
| D265,724 S | 8/1982 | Khemka | D10/57 |
| 4,459,046 A | 7/1984 | Spirg | 374/162 |
| 4,468,137 A | 8/1984 | Hilsum | 374/160 |
| D281,147 S | 10/1985 | Khemka | D10/57 |
| 4,681,324 A * | 7/1987 | Karabed et al. | 359/1 |
| 4,888,219 A | 12/1989 | Barnes | 374/162 |
| 4,891,250 A | 1/1990 | Weibe et al. | 374/152 |
| 4,913,858 A * | 4/1990 | Miekka et al. | 264/1.34 |
| 5,181,905 A * | 1/1993 | Flam | 600/549 |
| 5,304,003 A | 4/1994 | Winninger | 374/150 |
| 5,662,986 A * | 9/1997 | Stepanek | 428/914 |
| 5,676,401 A * | 10/1997 | Witkowski et al. | 428/914 |
| D410,546 S * | 6/1999 | Brogden et al. | D24/189 |
| 5,921,061 A * | 7/1999 | Weder | 53/397 |
| 5,994,263 A * | 11/1999 | Ohshima et al. | 428/914 |
| 5,997,964 A | 12/1999 | Klima, Jr. | 374/162 |
| 6,110,864 A * | 8/2000 | Lu | 428/1.6 |
| 6,136,752 A * | 10/2000 | Paz-Pujalt et al. | 428/914 |
| 6,241,386 B1 * | 6/2001 | Limburg et al. | 374/162 |
| 6,327,801 B1 * | 12/2001 | Witkowski | 40/306 |
| 6,468,379 B1 * | 10/2002 | Naito et al. | 428/914 |

\* cited by examiner

| FILM 604 |
| COLOR (OR OPTIONAL HOLOGRAM) 606 |
| ADHESIVE TIE COAT 608 |
| TEMPERATURE SENSITIVE MATERIAL 610 |
| HOLOGRAM (OPTIONAL) 612 |
| BASE COAT/MASK 614 |
| BLOCKING LAYER 616 |
| ADHESIVE 618 |
| MOUNT 620 |

THIN FILM THERMOMETER WITH SENSORS THAT APPEAR AND DISAPPEAR FROM RESPECTIVE CONCEALING FEATURES ACCORDING TO TEMPERATURE

CROSS-REFERENCE TO RELATED APPLICATIONS

This application is a Continuation-In-Part of U.S. patent application Ser. No. 09/221,643, filed on Dec. 28, 1998, which subsequently issued as U.S. Pat. No. 6,241,386 on Jun. 5,2001. The entirety of the foregoing application is hereby incorporated herein by reference.

BACKGROUND OF THE INVENTION

1. Field of the Invention

The present invention generally relates to thermometers with components that react to changes in temperature by changing color, such as thermochromic liquid crystals (TLCs). More particularly, the invention concerns an apparatus or article of manufacture comprising a multi-colored decal such as an animal, flower, fish, or other design with spots or other features that individually reveal or display a message, depending upon temperature. According to the decal's current temperature, an appropriate one of the temperature sensors, normally camouflaged within the features of the decal, is activated and thus becomes visible.

2. Description of the Related Art

Temperaturee sensing devices come in a variety of forms, with various underlying scientific principles. One recent type of thermometer uses TLCs, usually constructed in a planar shape. TLCs react to changes in temperature by changing color. These materials are made of twisted molecular structures comprising optically active mixtures of organic chemicals. TLCs include cholesteric compositions, chiral nematic formulations, and combinations of the two.

TLCs show colors by selectively reflecting incident white light. "Temperature-sensitive" mixtures in thin films reflect bright, almost pure colors. They turn from colorless (black, against a black background) to red at a given temperature, and pass through the other colors of the visible spectrum in sequence as temperature increases. This progression includes orange, yellow, green, blue, and violet. At an even higher temperature, the crystals turn colorless (black) again.

In contrast to temperature-sensitive mixtures, "temperature-insensitive" formulations reflect just a single color below a given transition temperature, changing to colorless (black) above this temperature. These formulations are sometimes called "shear-sensitive" or "clearing point" mixtures. TLC formulations have also been developed that provide a bandpass feature, reflecting a single color within a prescribed temperature range, otherwise changing to colorless (black).

TLCs have been implemented in a variety of forms. One of the most prevalent examples is a temperature strip made by placing numerous TLC rectangles end to end. The rectangles are arranged so that, as the ambient temperature changes from lowest to highest readable temperature, the rectangles are individually illuminated sequentially from one end of the strip to the other. This is done by using bandpass-type TLC rectangles with sequentially increasing activating temperatures. One example is the reversible temperature sensor, part A5321, manufactured by Hallcrest, Inc. of Glenview Ill. With this particular part, the TLC in each rectangle is shaped into numbers defining the corresponding temperature sensed by that rectangle, such as "74."

TLC materials are used in many different product configurations. For example, some temperature strips are attached to a background border printed with certain textual information. For example, the border may include evenly marked numerical increments of temperature, a temperature scale (e.g., Celsius) that contrasts with that shown on the temperature strip, etc. With other products, the border material includes a cartoon drawing, ruler, or other non-textual information. In some cases, the printed border design provides a decorative function unrelated to the temperature strip; in other configurations, the printed border provides data with some relation to the temperature strip.

Although some of the thermometers discussed above enjoy widespread commercial success today, the present inventors have sought to improve the utility and operation of known thermometers.

SUMMARY OF THE INVENTION

Broadly, the present invention concerns a decal with multiple temperature sensors that individually appear within certain concealing features of the decal in accordance with different prescribed temperatures, otherwise blending into the concealing features and thereby disappearing into the design. The decal may depict an image of an animal, fish, flower, abstract form, or another design, such as a photograph, cartoon, sketch, or other representation. The image includes multiple separate concealing features, such as spots, fins, flower petals, abstract shapes, or other components of the decal's image. These features may have one color in common, or different concealing features may have different colors. The feature color(s) contrasts with one or more background colors in the design, which serve to visually separate the concealing features. The temperature sensors are scattered throughout the design in a visually pleasing manner. Importantly, the sensors are placed within the concealing features, where the non-activated color of each temperature sensor matches its surrounding concealing feature. Thus, non-activated sensors become camouflaged within their surrounding feature color(s).

The temperature sensors comprise a formulation that reacts to changes in temperature by changing color, and may comprise a thermochromic liquid crystal (TLC) material, for instance. Each temperature sensor is activated by a different ambient temperature range. As an example, each activated sensor may display a number representative of the corresponding temperature range, such as 78° F. Instead of numbers, the sensors may display other themes such as various colors, words, graphics, alphanumerics, etc. As a particular example, sensors may indicate various comfort or safety zones by displaying messages such as "too warm," "just right," or "too cold." Thus, according to the decal's current temperature, an appropriate one of the temperature sensors is activated, causing it alone to arise from its otherwise hidden position in one of the image's concealing features.

Each temperature sensor may be located apart from any others, i.e., no two sensors in the same concealing feature. Alternatively, temperature sensors may be arranged in different groups, where each group of sensors resides in the same concealing feature. Additionally, the invention also includes arrangements with a combination of grouped and solo sensor distribution. In many cases, it may be desirable to provide a design where the image and the temperature sensors are flat. However, surfaces with some desired contour may be used if required.

Accordingly, as discussed above, one aspect of the invention is an apparatus or article of manufacture, embodied in a decal with multiple concealing features that selectively display or conceal temperature sensors, according to the ambient temperature. Another aspect of the invention involves a method for manufacturing such a thermometer.

The invention affords its users with a number of distinct advantages. For example, many users will find these thermometers to be significantly more attractive and interesting than the often sterile, mathematical TLC strips of the past. Furthermore, animal owners seeking to provide a more authentic animal habitat for their pets will find the present thermometer decal to be more natural, and less visually distracting. Users may find particular benefit for this thermometer in aquariums, terrariums, solariums, and other microhabitats. Furthermore, other applications may include shower doors, windows, and other safety, environmental, or ornamental applications.

Among other uses, this thermometer may be implemented as an adhesive bandage or refrigerator magnet. The thermometer of this invention may be built with heat blocking backing, to increase the utility of the invention for indicating ambient temperature despite being mounted to warm or cool surfaces (such as a terrarium or outside window). Conversely, the thermometer maybe constructed for the reverse effect, namely to insulate the thermometer from ambient temperatures and encourage conductive heat transfer with the mounting surface. As another advantage, an adhesive tie coat may be incorporated into the manufacturing process to preserve temperature sensors made of cholesteric inks, which can exhibit poor adherence due to the brittle, grainy nature of such inks. Also, the invention offers enhanced visual effects, achieved through techniques such as the coordinated multiple activation of temperature sensors, incorporation of holograms, etc.

The invention also provides a number of other advantages and benefits, which should be apparent from the following description of the invention.

DETAILED DESCRIPTION

The nature, objects, and advantages of the invention will become more apparent to those skilled in the art after considering the following detailed description in connection with the accompanying drawings.

Hardware Construction

Figure 1:
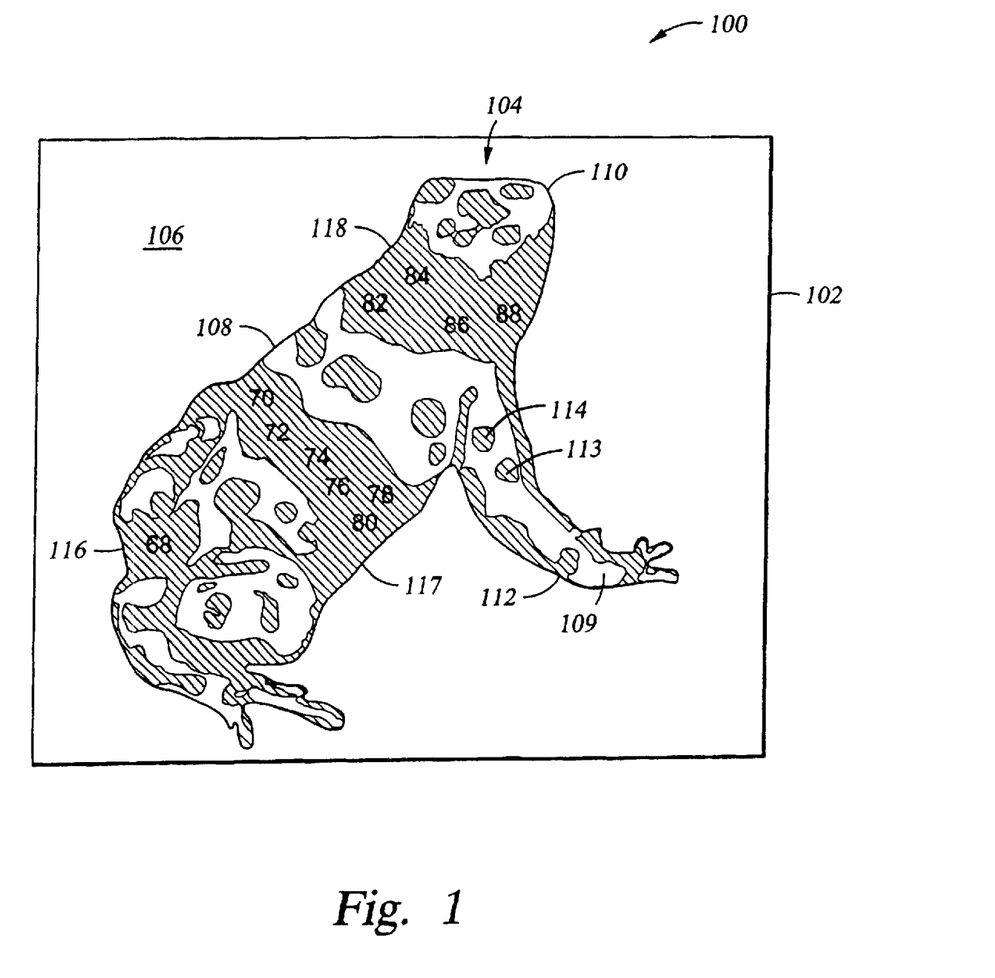
FIG. 1 is a plan view of a thermometer decal according to the invention.

FIG. 1 depicts one aspect of the invention, which concerns a decal 100 bearing the image 104 of an animal. Although the decal 100 may be constructed of various arrangements and different components, FIG. 1 illustrates an example of one specific implementation, which depicts a frog. Instead of animals, the decal 100 may be constructed to depict another form, such as a fish, flower, abstract design, etc. The decal 100 is comprised of a film with various "concealing features," and temperature sensors scattered among these features. In the illustrated example, the decal 100 includes a primary film 102 bearing an image 104 of an animal. In this example, the primary film 102 comprises a material that is thin, flexible, and water insoluble. Other desirable characteristics of this material include ready bonding to one or more types of ink and adhesive, and color stability despite exposure to light. As one example, the film 102 may be made of a polyester material. In a different example, to suit different applications, the primary film 102 may comprise glass or another transparent or semi-transparent material.

In the illustrated example, the film 102 is transparent. As an option, the film 102 may exhibit a "see-through" region 106 after construction of the image 104. The image 104 includes many different regions, exhibiting two or more colors, which together form an image of an animal. As an example, the image may be a photograph, cartoon, sketch, or other representation.

The image 104 includes one or more background regions and multiple concealing features. The background regions may exhibit one or more colors. The concealing features have one or more colors, each of which is distinct from the colors of the background region(s), thereby setting the concealing features apart from the background regions. In this example of FIG. 1, the image 104 includes various lightly colored regions (such as the regions 108–110), which provide the background regions. In the example of the illustrated frog image, the background regions (e.g., 108–110) may be light green. The image 104 also includes various darker regions (such as the regions 112–114), which provide the concealing features. In the example of the illustrated frog image, the concealing features (e.g., 112–114) may be dark green or black. In this example, the image 104 includes two colors: one background color and one feature color. The feature color and the background color are visually distinct to a human viewer. For this purpose, they may exhibit different shades of the same hue (e.g., light green and dark green), different hues (e.g., red and green), different patterns, etc. In each of the foregoing examples, the concealing features and background regions exhibit different "colors" as defined in this application.

The image 104 may be applied to a top or bottom surface of the film 102. For example, the image 104 as viewed in FIG. 1 may be applied over the film 102 (bonded to top surface), or the image 104 may be applied beneath the film 102 as viewed in FIG. 1 (bonded to bottom surface). The various colored regions of the image 104 may constitute ink, dye, additional layers of film, or other suitable regions having the desired colors.

The decal 100 also includes multiple temperature sensors, scattered throughout the design in a visually pleasing manner. The sensors may be located individually, such as the sensor 116, and/or in sensor groups, such as the respective sensor groups 117 and 118. Importantly, each non-activated sensor is camouflaged within its respective concealing feature. This may be achieved in a number of different ways.

For example, each sensor may be layered with a base coat that matches the color of its concealing feature. In the case of black concealing features, a suitable base coat may be a matching black base coat #8202DA, commercially available from Hallcrest, Inc. of Glenview Ill. In the foregoing embodiment, the sensors may be transparent when non-activated, permitting the color of the underlying base coat to show through, and thereby concealing the temperature sensor within the surrounding concealing feature whose color matches the base coat.

In a different embodiment, the sensors may omit the base coat or use a white or transparent base coat, where each sensors when not activated exhibits the color of its respective concealing feature. In this embodiment, non-activated sensors become camouflaged within the animal's background color by virtue of their non-activated colors. Relatedly, activated sensors appear from their concealing features by exhibiting a color that contrasts with the concealing feature.

Each sensor comprises a temperature sensitive substance, such as a TLC. For instance, the sensors may be manufactured from cholesteric formulations, chiral nematic formulations, a combination of cholesteric and chiral nematic components, etc. As a particular example, one type of sensor formulation is liquid crystal coat #8202DB, commercially available from Hallcrest, Inc. of Glenview, Ill. Coat #8202DB is a temperature-sensitive, water-based coating, containing a microencapsulated cholesteric liquid crystal mixture. In one embodiment, each temperature sensor exhibits bandpass temperature sensitivity. In this example, the temperature sensor is activated only in response to a prescribed temperature range, such as 71.5°–72.4°; above or below this range, the temperature sensor is not activated.

Each sensor has a different temperature sensitivity. In other words, each temperature sensor is activated by a different ambient temperature range. As shown in FIG. 1, each activated sensor displays a number representing a corresponding temperature range. For instance, the sensor 116 displays "68" when it senses an ambient temperature near 68° F. Sensors in the group 117 indicate temperatures of 70°, 72°, 74°, 76°, 78°, and 80° F. Although all temperature sensors are shown simultaneously in FIG. 1, this is for ease of explanation only; in practice, only one temperature sensor (or several sensors, if their activating temperature ranges slightly overlap) would actually appear at a time. Namely, because each sensor's base coat (or non-activated color) matches the background color, the sensors disappear into the features of the animal image 104. However, according to the decal's current temperature, an appropriate one of the temperature sensors is activated, causing it alone to arise from its otherwise hidden position in the animal image.

As an alternative to the numeric temperature indications, the sensors may display alphabetic messages, such messages representing comfort or safety zones, such as "too warm," "just right," or "too cold." Other alternatives include sensors displaying text-free colors or graphics, a combination of alphabetic and numeric descriptors, or another suitable scheme.

In many cases, it may be desirable to provide a design where the image and the temperature sensors are both flat. However, surfaces with some contour may be used if desired. Also, if desired, the image 104 may be cut from the film 102 to eliminate any surrounding film such as the see-through region 106. Furthermore, a transparent adhesive and peel-off backing (not shown) may be applied to the top or bottom surface of the decal 100, enabling a user to mount the decal 100 to an appropriate surface, such as a wall or a terrarium, aquarium, window, hamster cage, solarium, shower door, window, etc. Instead of adhesive, the decal may use static electricity, a natural affinity of the film material to non-porous surfaces such as glass or plexiglass, or another bonding technique.

As shown above, the animal image 104 and its camouflaged temperature sensors provide a visually pleasing means to monitor the ambient temperature in a pet's environment.

Manufacturing Process

Figure 2:
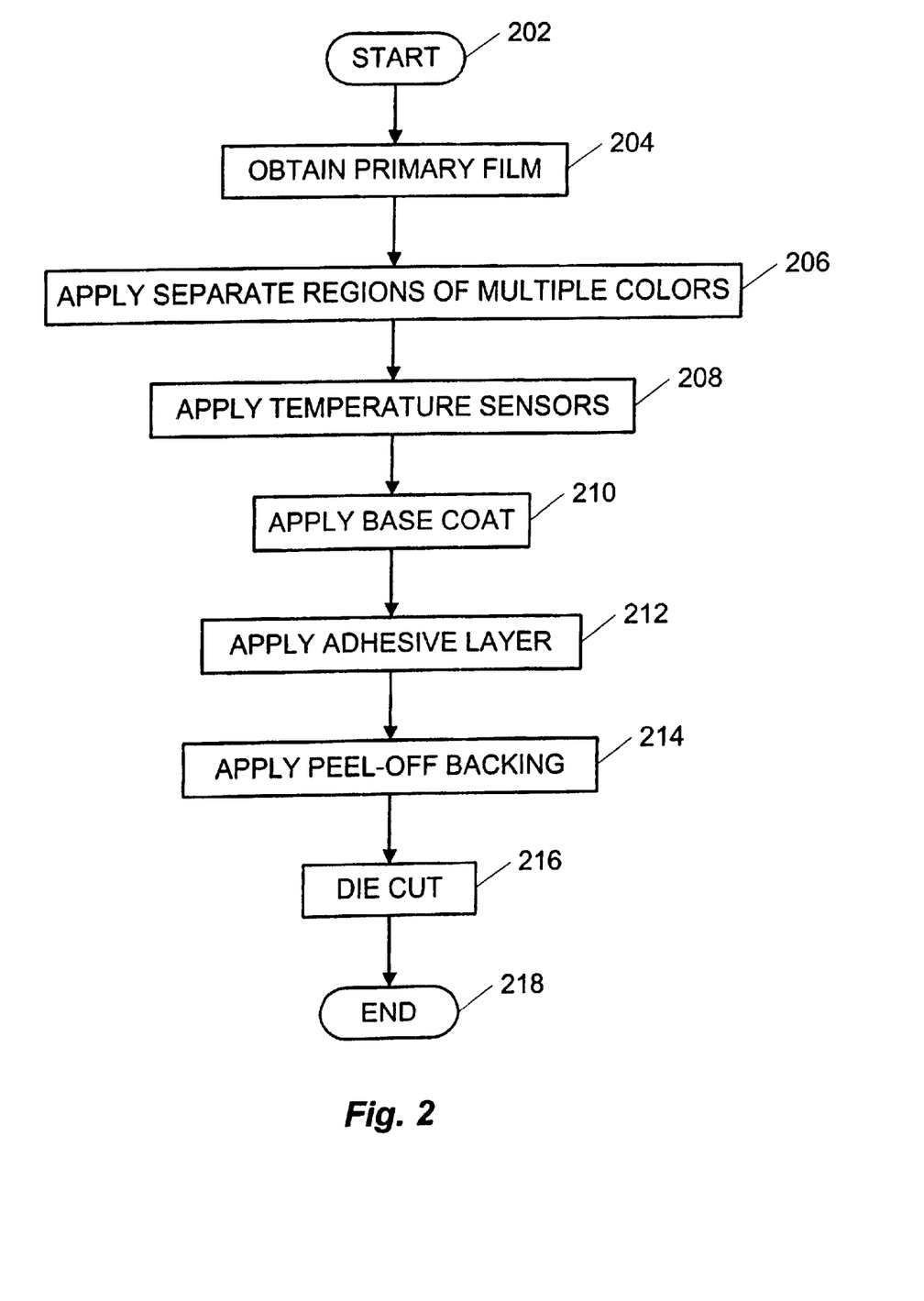
FIG. 2 is a flowchart of an operational sequence for manufacturing a thermometer decal, in accordance with the invention.

In addition to the structure described above, a different aspect of the invention concerns a method for manufacturing a multi-colored decal with disappearing temperature sensors. FIG. 2 shows a sequence of method steps 200 to illustrate one example of such a method. For ease of explanation, but without any limitation intended, the example of FIG. 2 is described in the context of the particular animal decal 100 of FIG. 1.

The steps 200 are initiated in step 202. First, the primary film 102 is obtained in step 204. Next, in step 206, various regions of multiple different colors are applied beneath the film 102 (as viewed into the page of FIG. 1). Some of these regions include, for example, regions 108–110 of the background color and regions 112–114 of the concealing feature color. In the example of FIG. 1, the regions are green (108–110) and black (112–114) areas defining the frog image 104. The green constitutes a background color, with the black providing the concealing feature color. In the present example, the colored regions are applied to the rear surface of the primary film 102, where the image 104 is intended to be viewed through the clear film 102. These regions may be applied by various processes, such as spraying, dipping, lithography, silk screening, floating, or another suitable printing technique. If desired, this process may involve selectively masking various regions of the film 102 to help define regions of the proper shape. For greater efficiency, all regions of a given color may be applied together in single step. After application of a region or color (as desired), the ink may be dried by air, cured with ultraviolet light, infrared heat, or treated by another technique to secure the coloring.

After step 206, step 208 applies the temperature sensors beneath the primary film 102 (as viewed into the page of FIG. 1). The temperature sensitive material may be applied, for example, by brushing, roller-coating, silk screening, or spraying using hand or automated equipment. The temperature sensors are applied so as to be surrounded by, adjacent to, or otherwise contiguous with concealing-feature-colored regions. This ensures that the inactive sensors disappear and blend into their respective concealing features.

Using similar techniques, the base coat is applied atop the temperature sensitive formulation in step 210 (i.e., below the temperature sensors as viewed into the page of FIG. 1). The base coat may be the color of the concealing feature, a different color, or clear; furthermore, the base coat may even be omitted entirely as discussed above. Following step 210, an adhesive layer is applied (step 212). The adhesive may be applied beneath the layering of the primary film 102, colored regions, temperature sensitive layers, and base coat (as viewed into the page of FIG. 1). Alternatively, the adhesive layer may be applied directly over the film 102 (above the film 102 as viewed into the page of FIG. 1), opposite the colored regions, temperature sensitive layer, and base coat. Alternatively, application of the adhesive may be omitted if the decal is to be mounted using static electricity, natural affinity of the film 102 or other materials in the decal for non-porous surfaces, etc.

If the adhesive layer is applied, a peel-off backing is applied atop the adhesive layer in step 214. Optionally, the completed film 102 may be dye cut to provide a finished decal in the shape of the image 104. After step 216, the process 200 is completed, as shown by step 218.

Ordinarily skilled artisans (having the benefit of this disclosure) will recognize various possible adjustments to the steps 200, without departing from the scope of this invention. As one example, the steps 200 may be changed in various ways. For instance, temperature sensitive formulation may be applied before or after the dye of the colored regions. Furthermore, the colored regions and temperature sensitive formulations may be applied to the front of the film 102 instead of the rear, or to a combination of front and rear surfaces. Thus, the base coat may be applied over or beneath the temperature sensitive formulation, depending upon whether the image 104 is to be viewed through the film 102 or from the side opposite the film 102.

Optional Enhancements

Depending upon the application at hand, the foregoing teachings may be altered, enhanced, optimized, further defined, or otherwise altered in various ways to achieve different, corresponding results.

Adhesive Bandage

Figure 3:
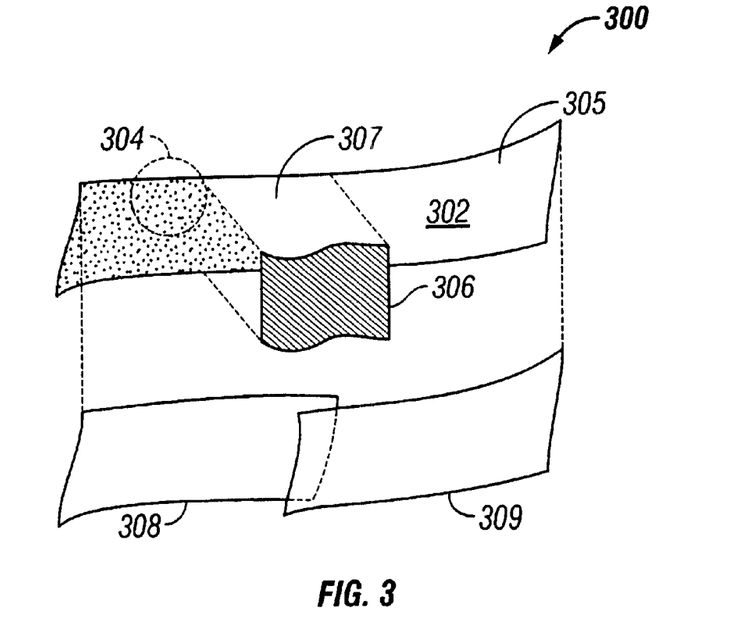
FIG. 3 is an exploded perspective view of an adhesive bandage incorporating a thin film thermometer according to the invention.

In one example, a thin film thermometer of this invention may be configured for use as an adhesive bandage 300 as shown in FIG. 3. Namely, the bandage 300 includes a thermometer 302 (similar to the decal 100 described above), which includes an adhesive layer on a wound-facing surface 305. The thermometer 302 may be provided with a number of optional apertures 304 to ventilate the skin beneath the bandage 300. To ensure flexibility of the bandage 300, the thermometer 302 may utilize a suitably pliable primary film such as a clear vinyl, foam-based polymer or other semi-rigid polymer, plastic, or another suitably pliable, biocompatible material. In this implementation, any layers beneath the temperature sensitive substance in the thermometer are made as thin as possible, to maximize thermal contact between the temperature sensitive substance and the patient's skin. An absorbent pad 306 is attached to the thermometer's inner surface 305. One or more removable strips, with two strips 308–309 being shown as one example, are provided to protect the adhesive layer upon the surface 305 of the bandage 300, prior to use. The strips 308–309 may comprise coated paper, plastic, or another material that is peelably removable from the surface 305.

In the illustrated application, the thermometer is configured such that its image (not shown) is visible when viewing from the outer surface 307 of the thermometer 302, the inner surface 302 being applied to the patient's skin. As with the decals described above, the image of the thermometer 302 includes multiple temperature sensors that individually appear within certain concealing features of the decal in accordance with different prescribed temperatures, otherwise blending into the concealing features and thereby disappearing into the design. This image may be configured to provide a numeric, alphabetic, or alphanumeric temperature indicator, a graphic or textual fever indicator, a combination of these, or another useful thermometer reading.

"Refrigerator" Type Magnet

As an example of another application, the thin film thermometer of this invention may be applied to a magnet such as a refrigerator type magnet. An example is shown by the structure 400 of FIG. 4. The structure 400 includes a thin film thermometer 402, such as the decal 100 discussed above, which includes a image 404. The decal 402 is applied to a magnetic underlayer 406.

Figure 4:
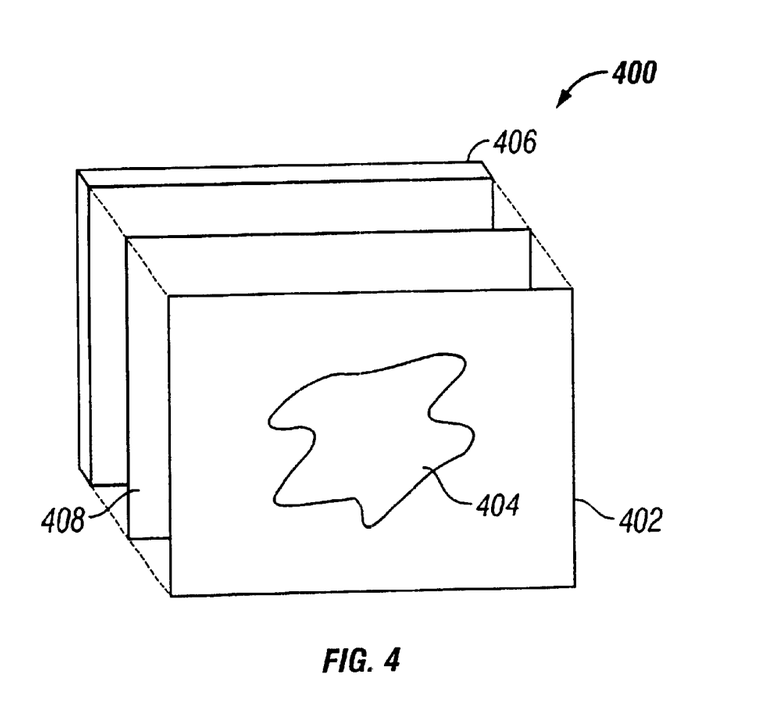
FIG. 4 is an exploded perspective view of a refrigerator type magnet incorporating a thin film thermometer according to the invention.

In one example, this thermometer 402 with magnetic backing may be used to indicate the ambient temperature (room temperature). To further accentuate this purpose by insulating the thermometer 402 from the magnetic layer 406 and the object to which the magnetic layer 406 is attached, the thermometer may include a blocking layer. Namely, a temperature insulating layer 408 may be inserted between the thermometer 402 and magnetic layer 406 to prevent heat conduction between the thermometer 402 and the refrigerator door or other medium to which the magnetic layer 406 is attached. Although refrigerators are utilized to suit a commonly known application, this is merely one example, and the structure 400 may be applied to other ferromagnetic surface as desired.

In contrast, other applications are contemplated where the thermometer is intentionally configured to sense the temperature of the object to which the magnetic layer 406 is attached, and to isolate the thermometer 402 from ambient temperature. To this end, the thickness of the thermometer's primary film may be increased (to insulate the thermometer's temperature/sensors from the ambient air), and the magnetic layer 406 may be sintered, selected, constructed, or processed to encourage conductive heat transfer. Some exemplary applications here include indicating the temperature of the contents of a metal drum, propane cylinder, or other ferromagnetic object.

Coordinated Multiple Illumination

As another optional feature, the thin film thermometer of the invention may be manufactured so that, in addition to illuminating a different sensor at each different temperature, multiple sensors may illuminate at certain temperatures. This is illustrated in greater detail with reference to FIG. 5, which illustrates a thin film thermometer 500. The thermometer 500 utilizes similar construction as the decal 100 (described above), including components such as concealing features, background regions, temperature sensors, primary film, and the like.

Figure 5:
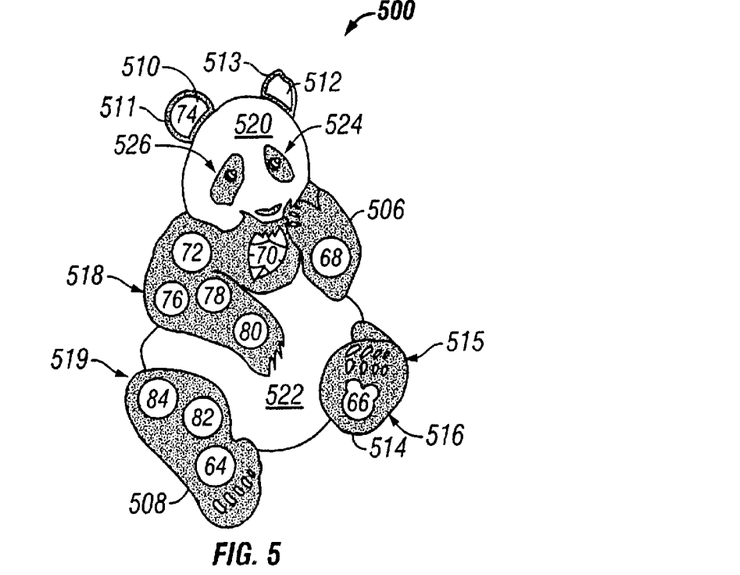
FIG. 5 is a plan view of a thin film thermometer configured to provide coordinated multiple illumination, according to the invention.

With the thermometer 500, some exemplary background regions are depicted by 520, 522, 524, 526. Some exemplary concealing features are shown by 506, 508, 511, 513, 514. In this example, the concealing features are black. The thermometer 500 includes various textual temperature sensors (such as 510, 518, 519, and 516) and various non-text temperature sensors (such as 512, 515). Some of the temperature sensors are situated individually within a concealing feature (such as concealing features 511, 513), and other sensors (e.g., 519) share the same concealing feature (as in the case of concealing features 506, 508). For ease of reference and discussion, FIG. 5 shows all sensors in their activated state, although in actual practice the sensors are individually activated in largely sequential fashion according to the rise/fall of the thermometer's temperature.

As mentioned above, the "coordinated multiple illumination" feature concerns the activation of multiple temperature sensors at certain temperatures. In addition, activation of one or more textual temperature sensors may be coordinated with one or more non-text sensors, to enhance the visual appearance, interest, and general curiosity supplied by the thermometer 500. As a more particular example, activation of the text sensor 510 (one panda ear) is coordinated with activation of the non-text sensor 512 (other panda ear). In other words, both sensors 510, 512 are configured to activate at about seventy-four degrees. When the sensor 510 is activated it displays the text message "74", otherwise the sensor is black and disappears into the concealing feature 511. When the sensor 512 is activated, it displays a color distinct from the concealing feature 513, otherwise melding into the concealing feature 513.

As a different example, activation of the text sensor 516 (shaped as the panda's foot pad) is coordinated with activation of the several sensors 515 (panda toe pads). Although the foregoing examples show coordination of a text sensor with a non-text sensor, the invention contemplates other arrangements, for example, coordination of two non-text sensors, two text sensors, different numbers and combinations of text/non-text sensors, etc.

Additional Components of Decal & Enhancements to Manufacturing Process

Figure 6:
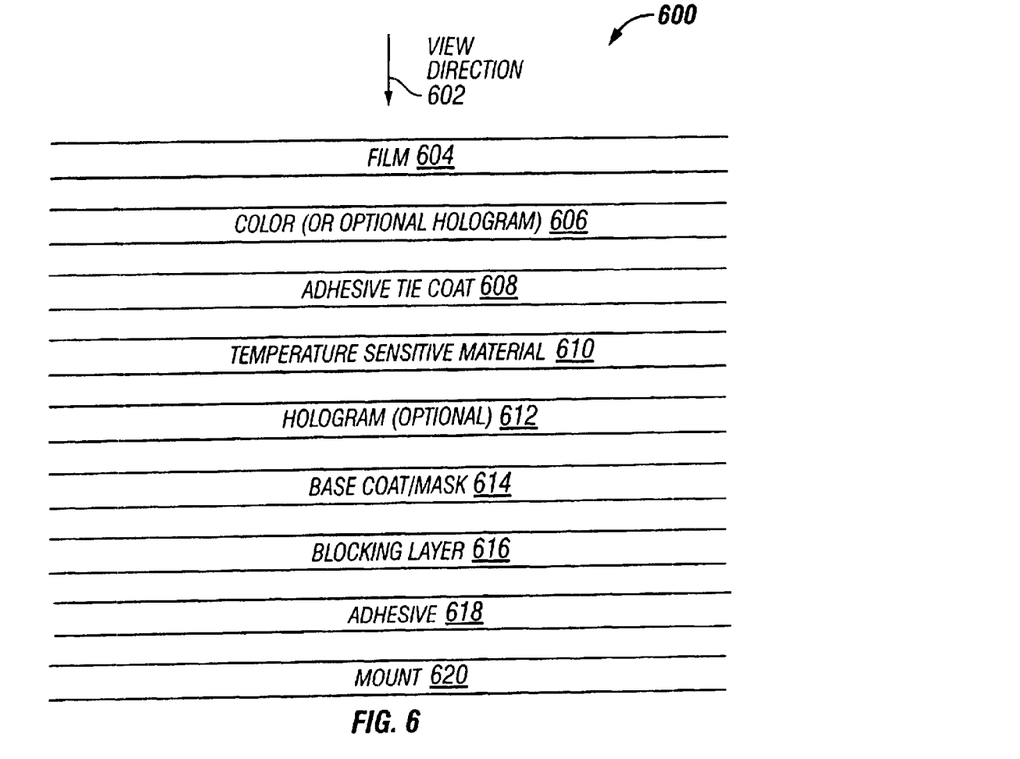
FIG. 6 is an exploded, cutaway side view of a thermometer of this invention.

As still another enhancement, the thermometer of the invention may be modified to include certain additional components, as discussed below. Accordingly, an enhanced manufacturing process is also discussed below. To best illustrate the components of this thermometer, FIG. 6 provides a cutaway, exploded side view of a thin film thermometer 600. For ease of understanding, the thermometer 600 includes some or all of the components of the decal 100 (discussed above) along with new components which are highlighted in the following discussion. The thermometer 600 is intended to be viewed in the view direction 602.

The decal 600 includes a film 604, which may provide the properties of the primary film discussed above. Beneath the film 604 lie one or more regions of color 606, which provide the background features and concealing features. Rather than a continuous layer underneath the film 604 (as shown, for ease of illustration) the color 606 is actually dispersed in selected locations as needed to provide the desired visual image, such as a panda, frog, etc. The content and application of the color layer 606 are discussed in greater detail hereinabove. Importantly, to accommodate temperature sensors therein, concealing regions in the layer 606 may define one or more "windows." In one embodiment, such windows comprise regions devoid of concealing region color other than an appropriate text message to be displayed. For example, in the case of the sensor 516 (FIG. 5), the concealing region 514 defines a vacant footpad area with the message "66" therein. In a different embodiment, the window itself may be defined in the shape of the desired text message. In either case, temperature sensitive material is later applied to the thermometer (as discussed below) in alignment with the window, such that activation of the temperature sensitive material illuminates the text message and deactivation of the material masks the text message causing it to blend into the concealing feature.

Optionally, instead of the color 606 (or in addition thereto), the layer 606 may comprise a hologram 606. Holograms are a well known commodity, which generally comprise photographic recordings of images, configured to organize incoming light into a three-dimensional representation of the original object. As still another option, layer 606 may be omitted, for example if a hologram is integrated into the thermometer 600 at 612, as discussed below.

Beneath the layer 606, an adhesive tie coat 608 may be utilized. The adhesive tie coat 608 comprises an adhesive layer to enhance the bonding of temperature sensitive material 610 (discussed below) to the overlying color 606, hologram 606, and/or film 604. The coat 608 may comprise, for example, a water or alcohol based clear adhesive, such as the type of adhesive used on stickers that are applied by peeling them from a non-stick backing. Material of the coat 608 may be specifically selected to assist the bonding of cholesteric inks, which the present inventors have found to be grainy and brittle. Beneath the tie coat 608 lies the temperature sensitive material 610, whose content and application are discussed hereinabove. Some examples include TLC, and more particularly, cholesteric formulations, chiral nematic formulations, a combination of cholesteric and chiral nematic components, etc. Each of the temperature sensitive areas 610 acts as a temperature-dependent shutter or photo-spectral refractor, selectively assuming a color distinct from the overlying/surrounding concealing region ("activating") or assuming a color that substantially matches the respective concealing region ("deactivating"). More particularly, thermochromic ink refracts primary colors similar to how a prism works; when out of its temperature range, it passes the light to the black mask, where it is absorbed. Activation of each temperature sensitive area 610 depends upon that area's temperature range, as discussed above.

Optionally, a hologram 612 may be located beneath the temperature sensitive layer 610 and above a mask 614. This location (612) may be in addition to (or substitution for) the hologram 606. The choice of where to apply the hologram (606 or 612) is one of visual preference, since having the hologram 606 over the temperature sensitive layer 610 provides one visual effect, whereas having the hologram 612 beneath the layer 610 provides a different visual effect.

Beneath the temperature sensitive layer 610 (or hologram 612) lies a base coat 614, also called a mask. The composition and application of the base coat 614 is discussed in greater detail above. Beneath the base coat 614, an optional blocking layer 616 may be utilized. The blocking layer 616 serves to thermally insulate the layers 604–614 from the object to which the thermometer 600 is mounted, shown as mount 620. The blocking layer 616 may comprise an insulator, reflector, or a combination of these. For example, the layer 616 may comprise a white or silver backing that minimizes infrared radiation arriving from the direction of the mount 620. The layer 616 may be especially desirable in applications where the mount 620 is particularly warm or cool, such as a terrarium, house window, etc.

Optionally, an adhesive 618 may be applied beneath the base coat 614 (or blocking layer 616 if present). In products such as educational multiplication tables or post cards, for example, there may be no backing or adhesive, or a backing suitable for writing or printing may be provided. As for the composition and application of adhesive layer 618 (if applied), greater detail is given hereinabove. Beneath the adhesive layer 618, the mount 620 is shown to represent an item to which the thermometer 600 is adhered. Alternatively, the thermometer 600 may include a peel-off backing situated where the mount 620 is shown, and subject to eventual removal by the customer. As still another alternative, a magnetic layer may be located where the mount 620 is shown, in case the thermometer 600 is utilized as a refrigerator or other magnet.

Figure 7:
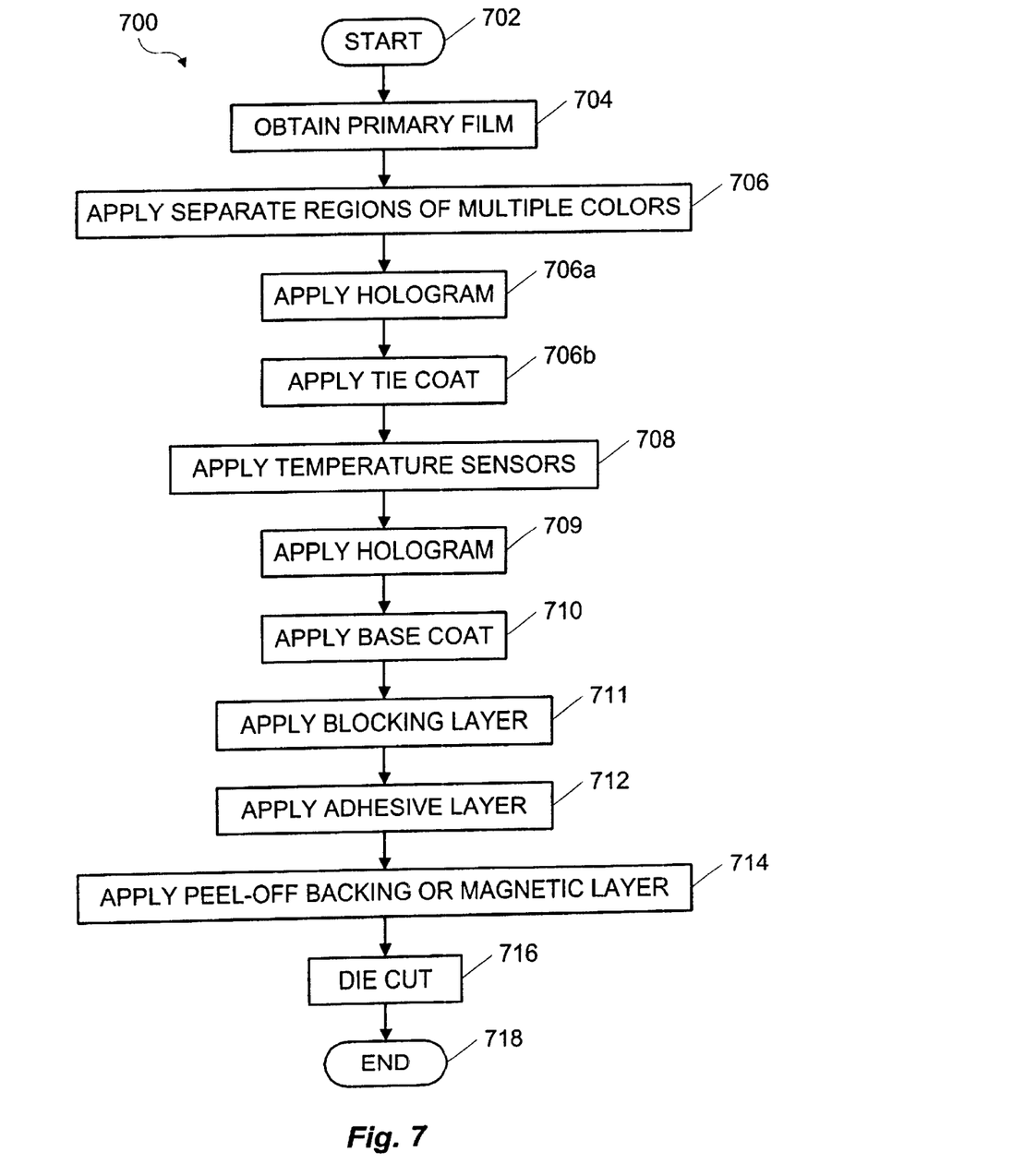
FIG. 7 is a flowchart of an enhanced operational sequence for manufacturing a thin film thermometer, in accordance with the invention.

Referring to FIG. 7, the enhanced manufacturing process associated with the thermometer 600 is described. The ease of explanation, but without any limitation intended, the example of FIG. 2 is described in the context of the particular thin film thermometer 500 of FIG. 5.

The steps 700 are initiated in step 702. First, the primary film 604 is obtained in step 704. Next, in step 706, various regions of multiple different colors are applied beneath the film 604 (as viewed into the page of FIG. 5). Some of these regions include, for example, regions 520, 522 of the background color and regions 506, 508, 511, 513, 514 of the concealing feature color. In the example of FIG. 5, the colors include black (506, 508, 511, 513, 514) and white (520, 522) areas defining a panda image. The white areas provide a background color, with the black areas providing the concealing feature color. In the present example, the colored regions are applied to the rear surface of the primary film 604 where the image is intended to be viewed through the clear film 604. These regions, which constitute the layer 606, may be applied by various processes, as discussed above.

In step 706a (optional), one or more holograms are applied to the film 604. The holograms may be adhered to the film 604, or laid over the film and affixed by the application of subsequent layers. Although shown after step 706, step 706a may be performed before or concurrently with step 706. After step 706 (or step 706a if applied), the adhesive tie coat 608 is applied to the overlying color layer, hologram, and/or film 604 (step 706b). At minimum, the adhesive tie coat 608 is applied in areas where the temperature sensitive regions 610 will be applied, to thereby improve their adherence to the overlying sections of the thermometer 600.

After step 706, 706a, or 706b as appropriate, step 708 applies the temperature, sensors beneath the primary film 602 (as viewed into the page of FIG. 5). The temperature sensitive material is applied as discussed hereinabove. After step 708, a hologram 612 may be applied if desired (step 709), which may occur in addition to or substitution for the hologram 606 discussed in step 706a. The hologram 612 may be applied in the same manner as the hologram 606, discussed above.

After step 708 (or step 709 if applicable), step 710 is performed wherein the base coat 614 is applied atop the temperature sensitive formulation, i.e., below the temperature sensors as viewed into the page of FIG. 5. Following step 710, the optional blocking layer 616 may be applied (step 711). Then, after step 710 or 711, the adhesive layer is applied in step 712. As mentioned above, the adhesive 618 may be applied beneath the overlying layers 604–616; alternatively, a different adhesive layer may be applied directly over the film 604, i.e., above the film 604 as viewed into the page of FIG. 5), opposite the colored regions, temperature sensitive layer, and base coat. Alternatively, application of the adhesive may be omitted if the thermometer 600 is to be mounted using other means (such as static electricity, natural affinity of the film 604 or other materials in the decal for non-porous surfaces), or if the thermometer is not intended for mounting at all.

If the adhesive layer 618 is applied, a peel-off backing is applied atop the adhesive layer in step 714. Alternatively, the adhesive 618 may be used to stick the thermometer 600 to a magnetic layer. Optionally, the completed thermometer 600 may be dye cut to provide a finished decal in the shape of the image (step 716). After step 716, the process 700 is completed, as shown by step 718.

Other Embodiments

While the foregoing disclosure shows a number of illustrative embodiments of the invention, it will be apparent to those skilled in the art that various changes and modifications can be made herein without departing from the scope of the invention as defined by the appended claims. For example, although animal-shaped designs have been used as convenient and tangible examples, ordinarily skilled artisans (having the benefit of this disclosure) will recognize that the present invention may be implemented with a tremendous variety of other different shapes and images. Furthermore, although elements of the invention may be described or claimed in the singular, the plural is contemplated unless limitation to the singular is explicitly stated.

What is claimed is:

1. An adhesive bandage, comprising:
   a thin film thermometer, comprising:
      a primary film bearing an image with multiple fixed-color, substantially black features distributed across the image, the features being separated by intervening regions contrasting in color with the features;
      multiple temperature sensors having irregular vertical and horizontal distribution across the image where each temperature sensor resides within a respective one of the features;
      where each sensor is activated in response to a different temperature range, each sensor when not activated substantially matching its respective feature, and each sensor when activated causing a different text message to appear by displaying a color distinct from its respective feature;
   an absorbent pad affixed to an underside of the thermometer;
   one or more pieces of peel-off backing adhered to the underside of the thermometer.

2. An adhesive bandage, comprising:
   a thin film thermometer including an animal image with a plurality of black regions separated by one or more non-black colors, where multiple of the regions include one or more corresponding temperature sensors and the sensors are scattered in irregular vertical and horizontal distribution across the image, each sensor activated responsive to a different temperature range, each sensor disappearing into the corresponding region when not activated, and when activated arising from the corresponding region to present a number representing one or more temperatures of the temperature range of that sensor;
   an absorbent pad affixed to an underside of the thermometer;
   one or more pieces of peel-off backing adhered to the underside of the thermometer.

3. A magnetic temperature indicator, comprising:
   a thin film thermometer, comprising:
      a primary film bearing an image with multiple fixed-color, substantially black features distributed across the image, the features being separated by intervening regions contrasting in color with the features;
      multiple temperature sensors having irregular vertical and horizontal distribution across the image where each temperature sensor resides within a respective one of the features;
      where each sensor is activated in response to a different temperature range, each sensor when not activated substantially matching its respective feature, and each sensor when activated causing a different text message to appear by displaying a color distinct from its respective feature;
   a magnetic layer affixed to the thermometer.

4. A magnetic thermometer apparatus, comprising:
   a thin film thermometer including an animal image with a plurality of black regions separated by one or more non-black colors, where multiple of the regions include one or more corresponding temperature sensors and the sensors are scattered in irregular vertical and horizontal distribution across the image, each sensor activated responsive to a different temperature range, each sensor disappearing into the corresponding region when not activated, and when activated arising from the corresponding region to present a number representing one or more temperatures of the temperature range of that sensor;

a magnetic layer affixed to the thermometer.

5. An article of manufacture comprising a thin film thermometer, comprising:

a primary film bearing an image with multiple fixed-color, substantially black features distributed across the image, the features being separated by intervening regions contrasting in color with the features;

multiple temperature sensors having irregular vertical and horizontal distribution across the image where each temperature sensor resides within a respective one of the features;

where each sensor is activated in response to a different temperature range, each sensor when not activated substantially matching its respective feature, and each sensor when activated causing a different text message to appear by displaying a color distinct from its respective feature;

one or more holograms integrated into the image.

6. A temperature indicating apparatus, comprising:

a thin film thermometer including an animal image with a plurality of black regions separated by one or more nonblack colors, where multiple of the regions include one or more corresponding temperature sensors and the sensors are scattered in irregular vertical and horizontal distribution across the image, each sensor activated responsive to a different temperature range, each sensor disappearing into the corresponding region when not activated, and when activated arising from the corresponding region to present a number representing one or more temperatures of the temperature range of that sensor;

the thermometer further comprising one or more holograms.

7. A thin film, thermally sensitive image generating apparatus, comprising:

a multilayer thin film thermometer including a primary film;

one or more holograms attached to one or more of the layers;

multiple temperature sensors attached to one or more of the layers, each temperature sensor comprising a thermally activated color changing material, where at least some of the temperature sensors overlap one or more of the holograms when viewed from a position normal to the film;

also attached to one or more of the layers, an image with multiple fixed-color, substantially black features distributed across the image the features being separated by intervening regions contrasting in color with the features;

where each sensor is activated in response to a different temperature range, and where one or more of the sensors are positioned within openings of respective concealing features when viewed from a location normal to the film, each sensor when not activated substantially matching its respective concealing feature, and each sensor when activated displaying a color distinct from its respective concealing feature.

8. A thermometer apparatus, comprising:

a primary film having a front surface and a rear surface;

bonded to the rear surface, an image layer comprising at least one of the following:
   colored inks presenting an image with multiple fixed-color, substantially black features distributed across the image, the features being separated by intervening regions contrasting in color with the features;
   one or more holograms;

bonded to the image layer, an adhesive tie coat;

bonded to the adhesive tie coat, a sensor layer including multiple areas of temperature sensitive ink, the areas having irregular vertical and horizontal distribution across the image where each area is positioned so as to reside within a respective one of the features when viewed from the front surface, where each area is activated in response to a different temperature range, each area when not activated substantially matching its respective feature, and each area when activated causing a different text message to appear by displaying a color distinct from its respective feature;

bonded to the sensor layer, a base coat.

9. The apparatus of claim 8, further comprising:

a heat blocking layer applied to the base coat.

10. The apparatus of claim 8, further comprising:

a hologram interposed between the sensor layer and the base coat.

11. A thermometer apparatus, comprising:

a thin film thermometer structure, comprising:
   a primary film bearing an image with multiple fixed-color, substantially black features distributed across the image, the features being separated by intervening regions contrasting in color with the features;
   multiple temperature sensors having irregular vertical and horizontal distribution across the image where each temperature sensor resides within a respective one of the features;
   where each sensor is activated in response to a different temperature range, each sensor when not activated substantially matching its respective feature, and each sensor when activated causing a different text message to appear by displaying a color distinct from its respective feature;

where the image and sensors are viewable from a front surface of the thermometer structure, and the apparatus further comprises a heat blocking layer affixed to a rear surface of thermometer structure opposite the first surface.

12. A thin film thermometer apparatus, comprising:

a primary film bearing an image with multiple fixed-color, substantially black features distributed across the image, the features being separated by intervening regions contrasting in color with the features;

multiple temperature sensors having irregular vertical and horizontal distribution across the image where each temperature sensor resides within a respective one of the features;

where the sensors are activated in response to different corresponding temperature ranges, each sensor when not activated substantially matching its respective feature, and each sensor when activated causing a different text message to appear by displaying a color distinct from its respective feature;

the apparatus further comprising at least one coordinated activation sensor noncontiguous with the multiple temperature sensors, wherein activation and deactivation of each of said at least one coordinated activation sensor is substantially synchronized with one of the multiple temperature sensors.

13. The apparatus of claim 12, where each coordinated activation sensor when activated causes one of the following to appear:

a text message, a non-text message.

14. A thin film thermometer apparatus, comprising:

a primary film bearing an image with multiple fixed-color, substantially black features distributed across the image, the features being separated by intervening regions contrasting in color with the features;

multiple temperature sensors having irregular vertical and horizontal distribution across the image where each temperature sensor resides within a respective one of the features;

where each sensors are activated in response to different corresponding temperature ranges, each sensor when not activated substantially matching its respective feature, and each sensor when activated causing a different text message to appear by displaying a color distinct from its respective feature;

the apparatus further comprising at least one additional sensor non-contiguous with said multiple temperature sensors, each said at least one additional sensor being activated only in response to a temperature range corresponding to one of the multiple temperature sensors.

15. An article of manufacture comprising a thin film thermometer, comprising:

a primary film bearing an image with multiple fixed-color, substantially black features distributed across the image, the features being separated by intervening regions contrasting in color with the features, where multiple of the black features define one or more corresponding windows therein;

multiple temperature sensors having irregular vertical and horizontal distribution across the image, each sensor comprising a region of thermally sensitive material positioned so as to align with one of the windows with respect to a line normal to the film;

where each sensor is activated in response to a different temperature range, each sensor when not activated substantially matching its respective feature, and each sensor when activated causing a different text message to appear by displaying a color distinct from its respective feature.

16. The article of claim 15, one or more of the windows each defining an aperture within the corresponding feature, the apertures including printing within the aperture forming one of the text messages.

17. The article of claim 15, one or more of the windows defining an aperture whose perimeter outlines one of the text messages.

18. A method of manufacturing a thin film thermometer, comprising operations of:

obtaining a substantially flat primary film having a front surface and an opposing rear surface;

applying to the rear surface one or more background regions and one or more concealing regions, each concealing region having defined therein one or more windows;

applying to the rear surface multiple substantially planar temperature sensors having irregular vertical and horizontal distribution across the primary film where each of the temperature sensors when viewed from the front surface resides within a window of a respective concealing region, each sensor being activated in response to sensing a different temperature range, wherein each sensor when not activated matches the color of its respective concealing region and each sensor when activated causes a different text message to appear in the window occupied by that sensor by displaying a color distinct from its respective concealing region.

19. The method of claim 18, the concealing regions being applied such that one or more windows additionally define by their shape a text message within the window.

20. The method of claim 18, the concealing regions being applied such that one or more windows include additional concealing region material therein to present a text message.

21. The method of claim 18, further comprising operations of:

applying a hologram to one or more layers of the thermometer.

22. The method of claim 18, the operations further comprising applying one or more holograms in at least one of the following locations:

between the primary film and the temperature sensors;

relative to the primary film, on an opposite side of the temperature sensors.

23. The method of claim 18, the operations further comprising applying a tie coat to the thermometer immediately prior to applying the temperature sensors.

24. The method of claim 18, the operations further comprising applying a heat blocking layer to the thermometer such that the background regions, sensors, and concealing regions lie between the film and the blocking layer.

25. The method of claim 18, the operations further comprising adhering a magnetic layer to the thermometer.

26. The method of claim 18, the operations further comprising adhering a paper backing to the thermometer.

27. A process of manufacturing a thermometer apparatus, comprising operations of:

providing a primary film having a front surface and a rear surface;

bonding an image layer to the rear surface, the image layer comprising at least one of the following:

colored inks presenting an image with multiple fixed-color, substantially black features distributed across the image, the features being separated by intervening areas contrasting in color with the features;

one or more holograms;

bonding an adhesive tie coat to the image layer;

bonding a sensor layer to the adhesive tie coat, the sensor layer including multiple regions of temperature sensitive material, the regions having irregular vertical and horizontal distribution across the image where each region is positioned so as to reside within a respective one of the features when viewed from the front surface, where each region is activated in response to a different temperature range, each region when not activated substantially matching its respective feature, and each region when activated causing a different text message to appear by displaying a color distinct from its respective feature;

bonding a base coat to the sensor layer.

* * * * *